Nov. 4, 1969   J. F. CLARKE ET AL   3,475,811
CLAD METAL
Filed Dec. 29, 1966   2 Sheets-Sheet 1
FIG.I.
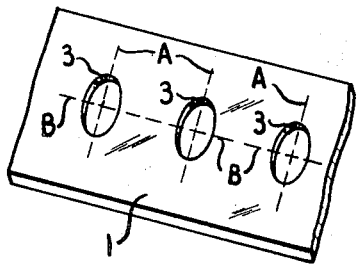
FIG.2.
FIG.3.
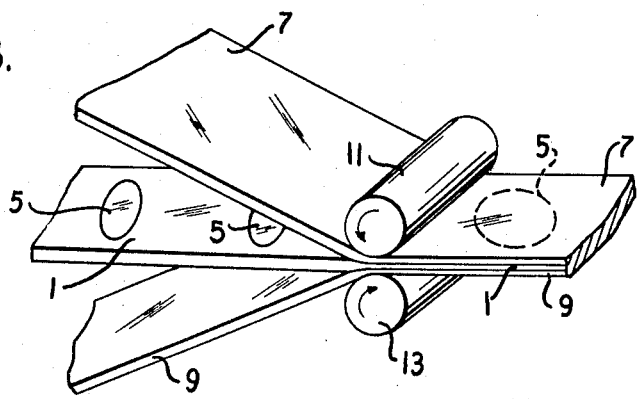
FIG.4.
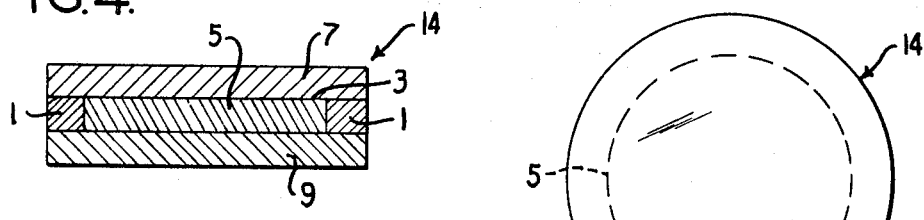
FIG.5.
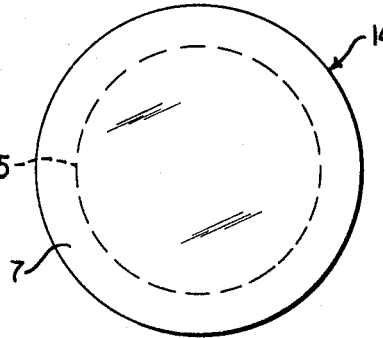
FIG.6.
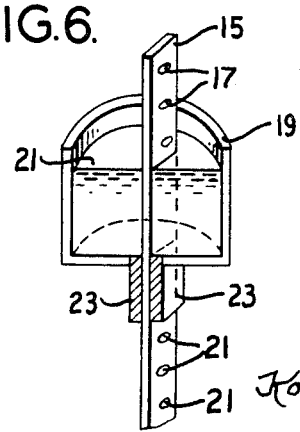
John F. Clarke,
Brian C. Coad,
Inventors,
Koenig, Senniger, Powers and Leavitt,
Attorneys

United States Patent Office 3,475,811
Patented Nov. 4, 1969

3,475,811
CLAD METAL
John F. Clarke, Attleboro, Mass., and Brian C. Coad, Fairfield, Worcester, England, assignors to Texas Instruments Incorporated, Dallas, Tex., a corporation of Delaware
Filed Dec. 29, 1966, Ser. No. 605,836
Int. Cl. B23k 31/02; B21b 3/00
U.S. Cl. 29—472.3
8 Claims

ABSTRACT OF THE DISCLOSURE

A strip of metal, in which are foreshortened holes infilled with foreshortened shapes of a different metal and of thickness equal to that of the strip, is sandwiched between two strips of metal and then solid-phase, roll-bonded therebetween with a reduction in thickness of the resulting composite and conversion of the foreshortened shapes to desired shape.

---

This invention relates to clad metal for the manufacture of articles containing a completely clad core and to methods for manufacturing such a clad metal.

Among the several objects of this invention may be noted the provision of metallurgically bonded clad metal from which blanks are obtained, each blank containing a completely clad core and each blank forming an intermediate product subject to further coining, forming or like operations to produce strong end products such as coins, pans and the like; the provision of rapid, low-cost methods for manufacturing such blanks; the provision of a clad metal product wherein an inner metal is effectively protected from electrochemical corrosion; the provision of clad metal objects wherein an objectionable marginal appearance of an inner sandwiched metal layer is avoided by completely surrounding it with cladding; and the provision of both solid-metal and powder metallurgy techniques in making the blanks. Other objects and features will be in part apparent and in part pointed out hereinafter.

The invention accordingly comprises the constructions, articles and methods hereinafter described, the scope of the invention being indicated in the following claims.

In the accompanying drawings, in which several of various possible embodiments of the invention are diagrammatically illustrated, FIG. 1 is a fragmentary view showing one metal layer during an initial stage of manufacture;

FIG. 2 is view showing a metal blank used with the FIG. 1 layer;

FIG. 3 is a view showing the FIG. 1 layer with the FIG. 2 blanks therein in the process of being clad with two layers of metal;

FIG. 4 is a cross-sectional view through a circular coin blank punched from the FIG. 3 clad metal strip;

FIG. 5 is a plan view of the FIG. 4 blank;

FIG. 6 is a cross-sectional view showing a step in the manufacture of clad metal strip according to another method of the invention.

Corresponding reference characters indicate corresponding parts throughout the several views of the drawings.

Figure 7:
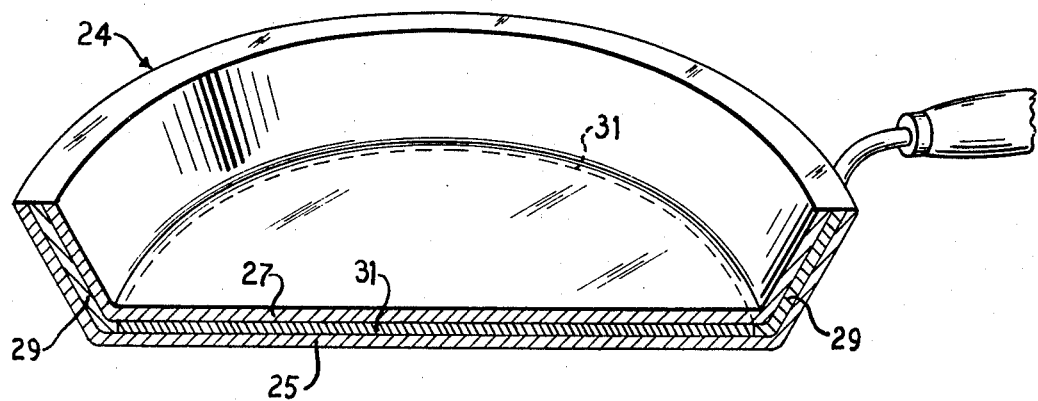
FIGS. 7 and 8 are cross-sectional views showing certain articles manufactured from the clad metal of the invention.

In the present application reference to metal is intended to include alloys thereof. Referring to the drawings, at 1 in FIG. 1 is shown a strip of metal having a plurality of elliptical holes 3 extending completely through it, the holes being formed by punching or other suitable means.

Holes 3 are preferably of the same size and shape and equally spaced along the length of strip 1. Each hole 3 has a major axis A which is transverse to the length of the strip and a minor axis B which is parallel to the length of the strip. With this arrangement the strip 1 can be reduced in thickness by rolling in the longitudinal direction of the strip to elongate the minor axis B of each hole until the holes become substantially circular in shape. Thus in effect the holes 3 as initially punched are foreshortened in the direction of the length of the strip 1.

A plurality of metal blanks or slugs 5 (FIG. 2) are formed from the metal desired to become the cores of the articles that are to be manufactured from the clad metal strip. Blanks 5 are composed of a different metal than that of strip 1. By way of example, blank 5 may be copper and strip 1 may be a copper-nickel alloy when present-day dimes or quarter dollars are to be manufactured from the final clad metal strip. The blanks 5 are preferably of substantially the same thickness as the strip 1 and they are substantially the same shape and size as the holes 3 in strip 1. Blanks 5 may be punched from a sheet of metal or they may be formed by pressing them to a desired density from powdered metal and then sintering them.

Blanks 5 are inserted into holes 3 in strip 1 as shown in FIG. 3. They may be press-fitted into the holes so that they will not drop out during further processing. Alternatively, a platen or a lower strip of the metal may be located closely beneath the strip 1 at the time the blanks are placed in the holes so that the blanks do not fall out if more loosely fitted. A more detailed description of means for holding the blanks 5 in the holes 3 is not given, since various means for accomplishing this will be apparent to those skilled in the art.

After a blank 5 has been placed in each of the holes 3, the strip 1 and the contained blanks 5 are bonded between two strips 7 and 9 of a suitable metal. Preferably, strips 7 and 9 are the same metal as the strip 1 and a different metal from that of the blanks 5. For example, to make blanks for coins each of strips 1, 7 and 9 may be a clean copper-nickel alloy and blanks 5 may be clean substantially pure copper. The bonding of the strips together preferably may be effected by a solid-phase roll-bonding process such as described in the Boessenkool et al. United States Patent 2,691,815 or the Boessenkool et al. United States Patent 2,753,623. Such a solid-phase bonding process is implied in FIG. 3 where the layers are shown being reduced in thickness for green bonding by passing them between squeeze rolls 11 and 13. It will be understood from said patents that for solid-phase bonding the surfaces to be bonded together are meticulously cleaned prior to reduction. Considerable pressure is exerted on the strips by rolls 11 and 13 to obtain substantial reduction in the thickness of the strips and blanks and effect a multiplicity of solid-phase so-called green bonds at interfacial areas of the strips 1, 7, 9 and blanks 5. After reduction by squeeze rolls 13, the strips are heated in a suitable atmosphere (such as cracked ammonia) to improve the green bonds. After bonding the bonded strips are again rolled down to the final thickness desired. The elliptical blanks 5 at this stage have become circular (see the composite at the right side of rolls 11 and 13 of FIG. 3).

While solid-phate bonding such as above described is preferred, it will be understood that bonding may be accomplished without initial reduction by brazing together the three strips and the blanks 5. Then the brazing assembly is rolled down to the thickness desired. In either case rolling stretches the strips 1, 7 and 9 so that the final form of the elliptical or foreshortened holes 3 and the contained blanks 5 is circular.

After the composite strip containing the blanks 5 has been rolled down to size, it is fed into a suitably timed blanking press having a punch of diameter greater than the diameter of the circular holes 3 which contain the circular blanks 5. Punching occurs when the punch axis is collinear with that of a circular core 5. The result is a fiinished blank such as illustrated at 14 in FIGS. 4 and 5 which is ready for any appropriate coining or forming operation as may be desired. Further description is not given in regard to means for suitably timing the operations of the blanking press relative to the positions of the blank-filled holes 3 in the strip 1, since various means for accomplishing this will be apparent to those skilled in the art.

As shown in FIGS. 4 and 5, the resulting composite blank comprises the core 5 covered on the upper and lower surfaces by discs taken from strips 7 and 9 and surrounded by an annulus taken from the strip 1. While for circular blanks it is preferable that the outside of the blank 14 be concentric with the core blank 5, this is not always necessary. Moreover, the final form of the core blank 5 and/or the composite blank 14 need not be round. It will be apparent, however, that in any case the shape of the original holes in the strip 1 and of the core blanks therein should be foreshortened in the direction of the length of strip 1 so that after elongation by rolling the desired shape of the holes and infilled core blanks will be as desired. It will also be apparent that if bonding is brought about by brazing of strips that do not require further rolling down to arrive at the final thickness of the composite strip, in such cases the foreshortening of the shapes of the holes in the core blanks is not required.

The blank shown in FIGS. 4 and 5 is particularly suitable for the manufacture of coins. For dimes or quarter dollars the strips 1, 7 and 9 are preferably formed from a suitable copper-nickel alloy, such as 70% copper and 30% nickel, and the blank 5 is pure copper. Other alloys suitable for use as strips 1, 7 and 9 include alloys comprising 60%–90% copper and 40%–10% nickel.

Previously, coins have been manufactured from clad metal comprising sheets of copper sandwiched between sheets of copper-nickel alloy. However, the edges of such coins were not clad with the surface metal. This left the copper exposed at the rims of the coins. This was objectionable due to the composite appearance of the coins and the susceptibility of the exposed center copper layers to electrochemical corrosion. Composite coins made from clad metal of the invention are not subject to these objections because the copper cores are completely enclosed by the surface metal.

Another advantage of the clad metal of the invention is that blanks 5 may be made from pressed metal powders which have been sintered. Pressed metal powders are not suitable for use as the center layer of composite coins if the pressed metal is exposed at the edges of the coins because then the coins would lack strength and be brittle. However, core blanks 5 may be made from pressed metal powders since they are completely enclosed by solid metal which provides the necessary protection and strength.

FIG. 6 of the drawings illustrates another process for filling holes in a perforated strip of metal with a different metal. In FIG. 6 a metal strip 15 is shown having a line of elliptical holes 17 therethrough, the holes being spaced apart longitudinally of the strip. The strip is passed downward through a crucible 19 containing molten metal 21. As the strip 15 leaves the bottom of the crucible it passes through a water-cooled jacket 23. The molten metal 21 in the crucible flows into the holes 17 as strip 15 moves through the crucible substantially to fill the holes. This molten metal is cooled and solidifies as the strip is drawn through jacket 23. Strip 15 with metal 21 therein can be used for manufacturing clad metal strip material in the manner previously described for strip 1.

FIG. 7 illustrates another use for clad metal manufactured according to the invention. This illustrates a pan 24 which comprises outer metal layers 25 and 27 having sandwiched therebetween an inner layer 29 of metal and a circular blank or core layer 31. Core 31 is preferably made of a metal different than that of layers 25, 27 and 29. The metal layers 25, 27 and 29 may be made of stainless steel, for example, and the layer 31 may be copper, aluminum, or another good heat conductor. The core layer 31 is sandwiched by layers 25 and 27 and surrounded by the annular layer 29. The core layer 31 preferably extends substantially entirely across the bottom of the pan for conducting heat from heating means upward into the pan.

Figure 8:
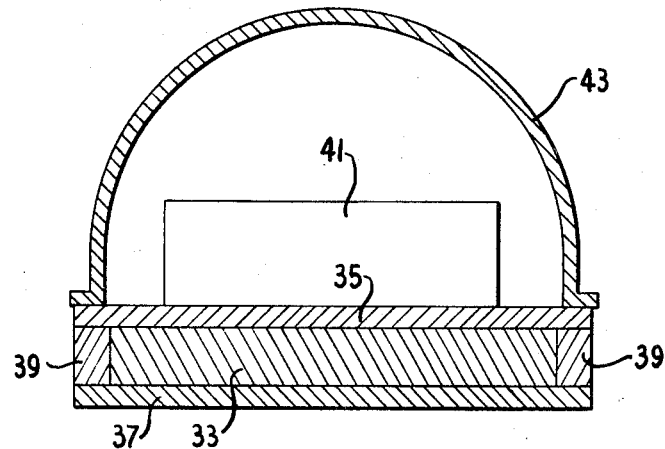

FIG. 8 illustrates another application or use for clad metal of the invention. In this case, the clad metal material comprises an inner metal core member 33 sandwiched between an upper metal layer 35 and a lower metal layer 37 and surrounded by a metal ring 39. The metal used for core 33 may be a good heat conductor, such as copper or aluminum, and the members 35, 37 and 39 may be formed from nickel or a nickel alloy. In this instance, the clad metal is used as a base member on which an electronic device 41 is mounted. The device 41 is located under a cover 43 which is welded to the upper metal layer 35. Heat given off by operation of the device 41 is quickly and evenly conducted away from the device downward through the clad metal layer. The core 33 acts as a heat sink to prevent hot spots in the device 41.

Metal blanks suitable for use in the manufacture of composite half dollars have been made according to the following process:

Three metal strips comprising 70% copper and 30% nickel were used, each of which was about 2½ inches wide and 12 inches long. The two strips which were used to form the outer layers of the clad metal were about 0.075 inch thick, whereas the other strip which was used as the center strip was about 0.200 inch thick. Elliptical-shaped holes were made in the center strip and spaced along the length of the strip. The holes had a minor axis of 0.150 inch and a major axis of 0.750 inch. Copper blanks were machined to the size of the holes and placed in the holes in the center strip. Then the metal strips were cleaned by brushing and assembled one above the other with the strip containing the copper blanks being positioned between the other two strips. Then the assembled strips were roll-bonded, during which time the composite thickness was reduced from about 0.350 inch to about 0.140 inch and bonds were formed between the interfaces of the strips. The resulting composite strip was sintered at about 1700° F. in cracked ammonia gas to improve the bond. Then the clad metal strip was rolled to a finished thickness of about 0.070 inch. In each instance rolling was in a direction parallel to the minor axis of the elliptical holes in the center strip. The copper cores or blanks and the center strip were reduced in thickness about 80%, causing the holes and the core to become substantially circular in shape. The coin blanks were then punched out of the clad metal strip so that none of the core or blank metal was exposed at the edges.

While the metals used in the outer layers or strips have been described as being the same as the metals used for the inner layer or strip it will be understood that different metals may be used if desired.

In view of the above, it will be seen that the several objects of the invention are achieved and other advantageous results attained.

As various changes could be made in the above constructions, articles and methods without departing from the scope of the invention, it is intended that all matter contained in the above description or shown in the accompanying drawings shall be interpreted as illustrative and not in a limiting sense.

What is claimed is:

1. The method of manufacturing composite completely clad metal articles comprising forming at least one hole through a first sheet composed of one metal, inserting into the hole a second sheet composed of another metal having substantially the same thickness as that of said first sheet and substantially the same outline as that of the hole, thereby forming a subassembly, sandwiching said subassembly between two additional sheets of metal, metallurgically bonding said sheets to form a bonded composite, and removing from said bonded composite an area thereof having an outline containing the outline of said first-named hole to form the composite article.

2. The method according to claim 1 wherein said metallurgical bonding step is accomplished in the solid phase by reduction of said composite.

3. The method of manufacturing composite clad metal articles comprising forming a sequence of holes in a metal strip, inserting into the holes sheets of another metal, said sheets having substantially the same outlines as those of the holes and having thicknesses substantially equal to that of the strip, moving said strip with the sheets contained in said holes with adjacent metal strips through metallurgical bonding means to interfacially bond the strips and sheets, thereby to form a composite strip, and then removing from said composite strip areas thereof having outlines containing the outlines of said first-named holes, respectively.

4. The method according to claim 3, wherein said holes and said sheets are initially formed in shapes foreshortened in the direction of the length of the strip containing them, and including the step of rolling said composite strip lengthwise before removal of said areas whereby the shapes of said holes and sheets are expanded lengthwise.

5. The method of manufacturing composite clad metal blanks comprising forming a sequence of holes in a clean metal strip, said holes being foreshortened in outline in the direction of the length of the strip, inserting into each hole a layer of another metal having substantially the same outline as that of the hole, moving said strip with the metal contained in said holes between sandwiching metal strips through compression rolls to squeeze and interfacially solid-phase bond the strips and layers contained in said holes while reforming the holes and their contained layers, thereby to form a composite strip, and then punching and removing from said composite strip areas having outlines containing the outlines of said reformed holes, respectively.

6. The method of manufacturing a clad metal member comprising forming a hole through a first metal member, filling the hole with a metal core different from the metal of said member, said core being substantially equal in thickness to the thickness of the first metal member and having a shape and size substantially the same as the shape and size of the hole in said member and solid phase roll, and bonding upper and lower metallic layers to said member and to the metal core, the metal in the layers being different from the core metal.

7. A method according to claim 6 wherein the hole in said first metal member is filled by placing a liquid metal in the hole and solidifying the liquid metal.

8. The method according to claim 6 wherein the holes are filled by inserting blanks formed of compressed metallic particles having substantially the same shape and thickness as the holes in said strip.

References Cited

UNITED STATES PATENTS

| | | | |
|---|---|---|---|
| 312,485 | 2/1885 | Makin | 29—191.4 |
| 2,813,073 | 11/1957 | Saller et al. | 29—194 XR |
| 3,015,157 | 1/1962 | Reynolds et al. | 29—497.5 XR |
| 3,091,847 | 6/1963 | Peters | 29—497.5 XR |
| 3,103,478 | 9/1963 | Kooistra | 29—191.4 XR |
| 3,110,081 | 11/1963 | Hendriks | 29—420 |
| 3,310,388 | 2/1967 | Bennett et al. | 29—501 XR |

JOHN F. CAMPBELL, Primary Examiner

R. B. LAZARUS, Assistant Examiner

U.S. Cl. X.R.

29—191.4, 194, 481, 482, 500, 501, 502